United States Patent
Huang et al.

(10) Patent No.: US 9,558,646 B2
(45) Date of Patent: Jan. 31, 2017

(54) PROMPT CIRCUIT AND CUP UTILIZING THE SAME

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Tong-Qi Huang, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 28 days.

(21) Appl. No.: 14/691,351

(22) Filed: Apr. 20, 2015

(65) Prior Publication Data

US 2016/0210841 A1 Jul. 21, 2016

(30) Foreign Application Priority Data

Jan. 20, 2015 (CN) .......................... 2015 1 0026857

(51) Int. Cl.
| | |
|---|---|
| G08B 21/00 | (2006.01) |
| G08B 21/18 | (2006.01) |
| G01G 23/18 | (2006.01) |
| G01G 17/04 | (2006.01) |
| G01K 7/16 | (2006.01) |
| A01K 63/06 | (2006.01) |
| F21V 33/00 | (2006.01) |

(52) U.S. Cl.
CPC ............. *G08B 21/182* (2013.01); *G01G 17/04* (2013.01); *G01G 23/18* (2013.01); *G01K 7/16* (2013.01)

(58) Field of Classification Search
CPC ...... G08B 21/182; G01G 17/04; G01G 23/18; G01K 7/16
USPC ................................. 340/613, 636, 603, 666
See application file for complete search history.

(56) References Cited

U.S. PATENT DOCUMENTS

| | | | | |
|---|---|---|---|---|
| 5,119,279 | A * | 6/1992 | Makowsky | ........ A47G 19/2227 362/101 |
| 2013/0234858 | A1* | 9/2013 | Chen | .................... G01G 15/001 340/666 |
| 2014/0340229 | A1* | 11/2014 | Wu | ........................ G08B 21/24 340/603 |

* cited by examiner

*Primary Examiner* — Jack K Wang
(74) *Attorney, Agent, or Firm* — Zhigang Ma

(57) ABSTRACT

A prompt circuit in a drinking cup includes a processor, temperature sensing and weight sensing units, and a prompt unit. The temperature sensing unit displays to a user the temperature of the liquid. The weight sensing unit detects a weight of liquid in the cup, and transmits the weight to the processor. The prompt unit includes a communication unit and a speaker unit. When any change of the weight of liquid in the cup within a first preset time is less than a preset value, the processor outputs a first control signal, to control the speaker unit to output an alarm. When the weight of liquid in the cup in unchanged for a preset time period after the speaker unit has output the alarm, the processor outputs a second control signal to the communication unit and the communication unit outputs a reminding message to a user.

16 Claims, 4 Drawing Sheets

PROMPT CIRCUIT AND CUP UTILIZING THE SAME

FIELD

The subject matter herein generally relates to warning devices.

BACKGROUND

People frequently forget to drink adequate amounts, due to being busy at work, which results in an unhealthy lifestyle.

Therefore, there is need for improvement in the art.

BRIEF DESCRIPTION OF THE DRAWINGS

Implementations of the present technology will now be described, by way of example only, with reference to the attached figures.

DETAILED DESCRIPTION

Figure 1:
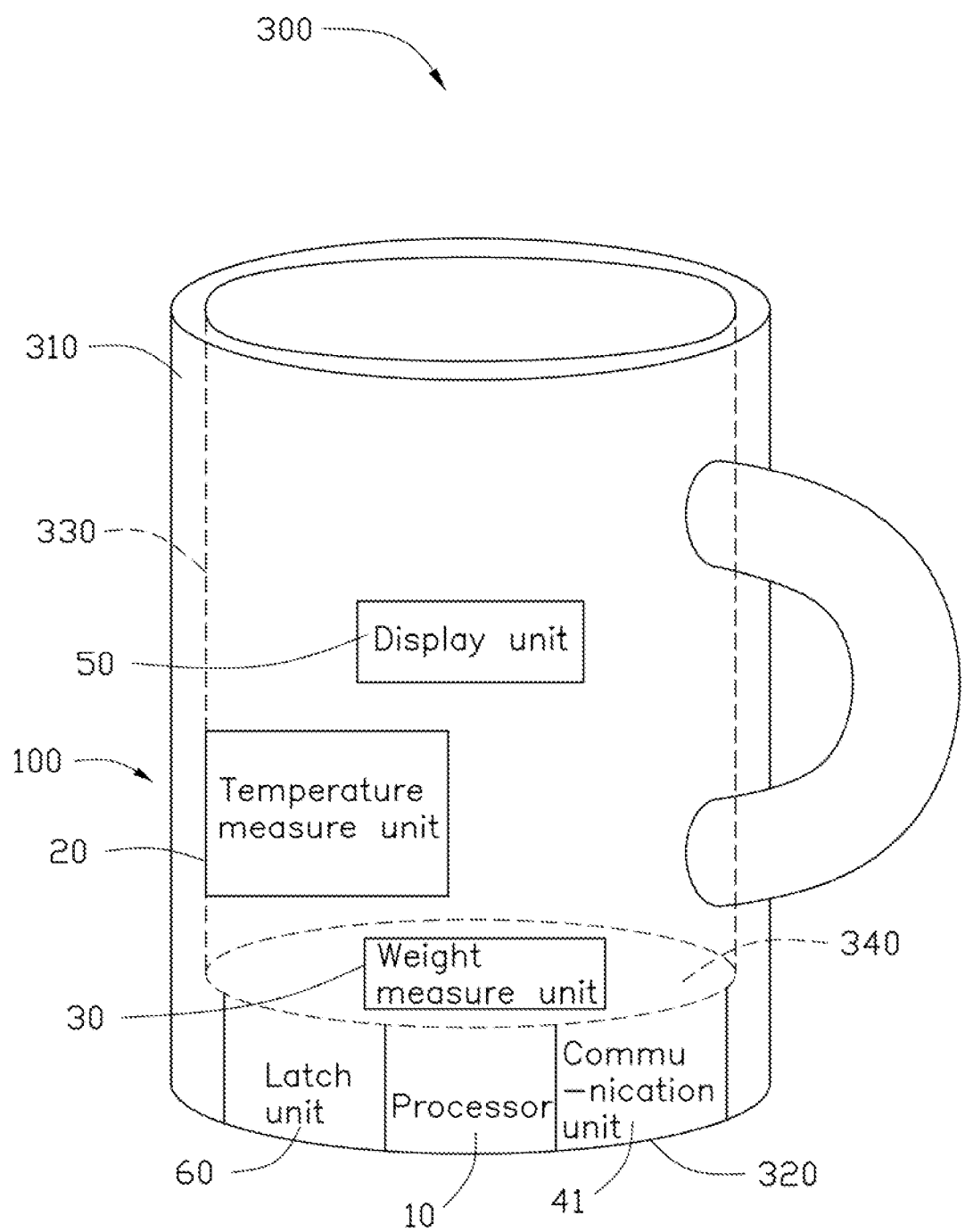
FIG. 1 is a diagrammatic view of an example embodiment of a cup, which comprises a prompt circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The disclosure will now be described in relation to a prompt and a drinking cup using the same.

FIG. 1 illustrates a diagrammatic view of an example embodiment of a cup 300. The cup 300 comprises a body 310, an external footwall 320, an inner side wall 330, and an inner footwall 340. The cup 300 also comprises a prompt circuit 100, for reminding people to drink on schedule.

Figure 2:
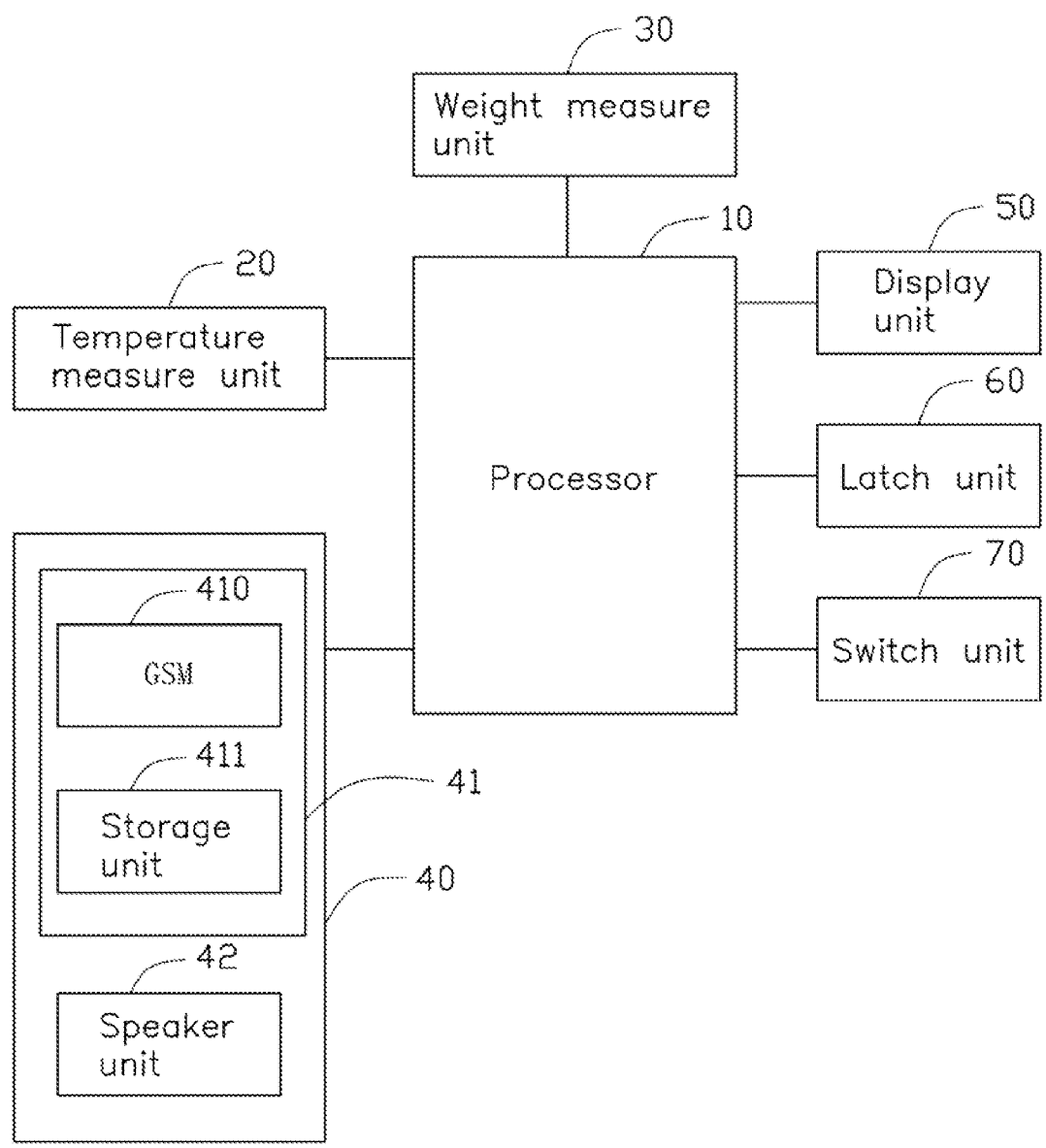
FIG. 2 is a block diagram of an embodiment of the prompt circuit of FIG. 1.

FIG. 2 illustrates a block diagram of an embodiment of the prompt circuit 100. The prompt circuit 100 includes a processor 10, a temperature sensing unit 20, a weight sensing unit 30, a prompt unit 40, a display unit 50, a latch unit 60, and a switch unit 70. The prompt unit 40 includes a communication unit 41 and a speaker unit 42. In the embodiment, the processor 10, the prompt unit 40, and the latch unit 60 are set on the external footwall 320 of the cup 300. The temperature sensing unit 20 is set on the bottom of the inner side wall 330 of the cup 300. The weight sensing unit 30 is set on the inner footwall 340 of the cup 300. The display unit 50 is set on the body 310 of the cup 300. The switch unit 70 can be set anywhere on or in the cup 300. In other embodiment, positions of the components of the prompt circuit 100 on the cup 300 can be adjusted according to actual requirements.

Figure 3:
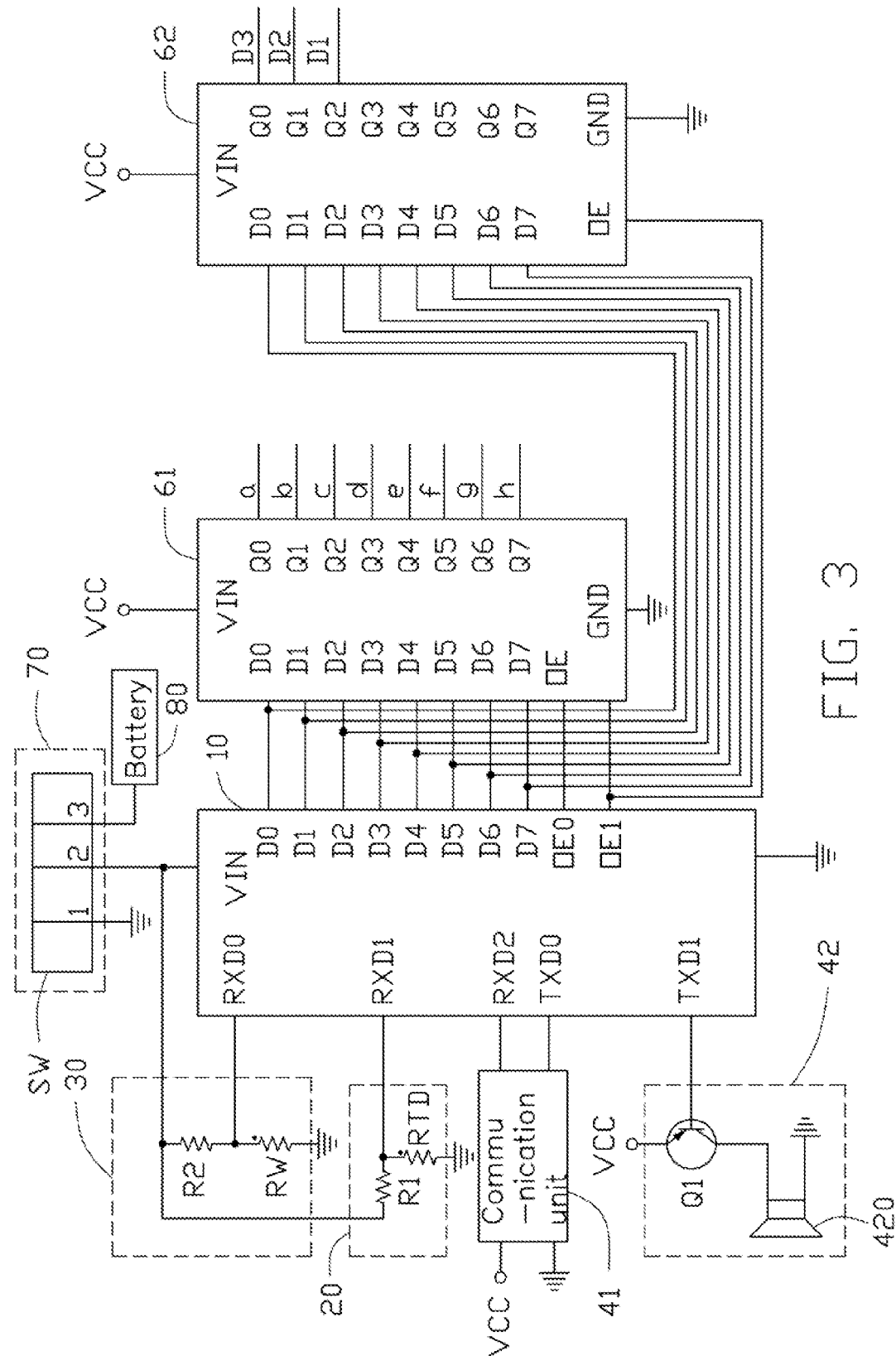
FIGS. 3 and 4 are circuit diagrams of an embodiment of the prompt circuit of FIG. 1.
Figure 4:
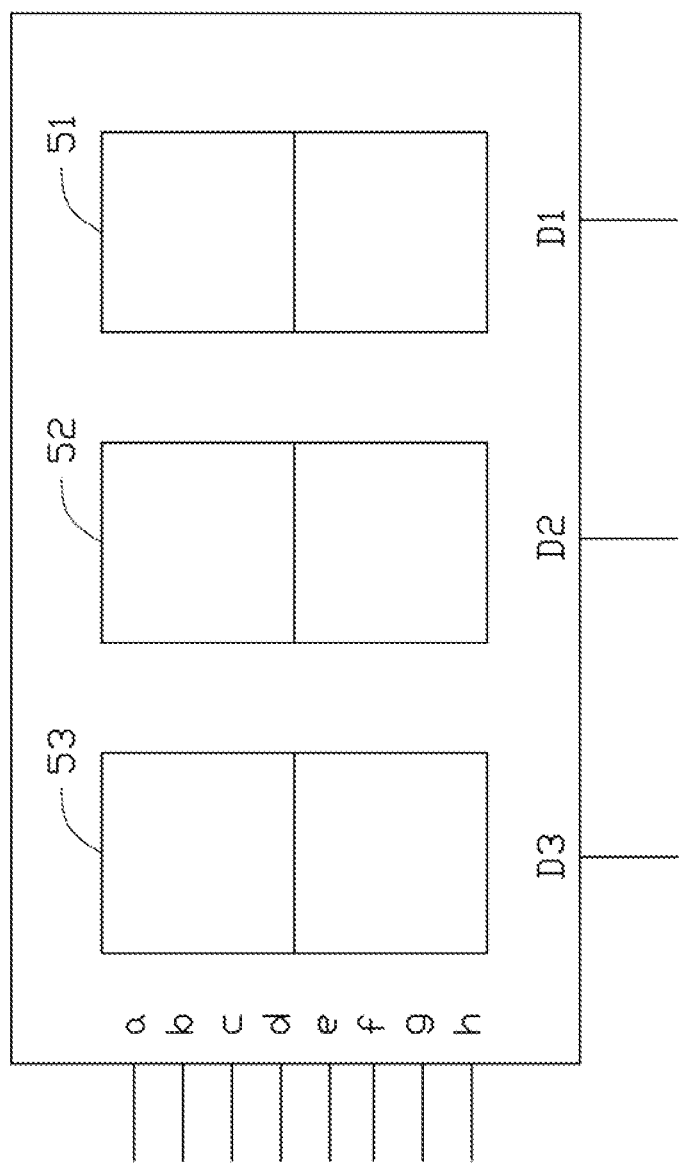

FIGS. 3 and 4 illustrate a circuit diagram of an embodiment of the prompt circuit 100. The processor 10 is a singlechip. The temperature sensing unit 20 comprises a resistor R1 and a resistance temperature detector RTD. The weight sensing unit 30 comprises a resistor R2 and a resistance weight detector RW. The communication unit 41 comprises a global system for mobile communication (GSM) chip 410 and a storage unit 411. The storage unit 411 stores a mobile phone number of a user. The speaker unit 42 comprises an electronic switch Q1 and a speaker 420.

In the embodiment, the electronic switch Q1 is a PNP bipolar junction transistor (BJT). The electronic switch Q1 can be replaced by a p-channel metal oxide semiconductor field-effect transistor (MOSFET). The display unit 50 comprises three numeric displays 51, 52, and 53. The latch unit 60 comprises a first latch 61 and a second latch 62. The switch unit 70 is a slip switch SW. The slip switch SW is coupled to a battery 80, for supplying power to the prompt circuit 100.

A voltage input pin VIN of the processor 10 is coupled to an active contact 2 of the slip switch SW. A stationary contact 1 of the slip switch SW is grounded. A stationary contact 3 is coupled to the battery 80. First terminals of the resistors R1 and R2 are coupled to the active contact 2 of the slip switch SW. Second terminals of the resistors R1 and R2 are coupled to first terminals of the resistance temperature detector RTD and resistance weight detector RW. Second terminals of the resistance temperature detector RTD and resistance weight detector RW are grounded. A data pin RXD0 of the processor 10 is coupled to a node between the resistor R2 and the resistance weight detector RW, to receive a signal (hereinafter "weight signal") output by the resistance weight detector RW. A data pin RXD1 of the processor 10 is coupled to a node between the resistor R1 and resistance temperature detector RTD, to receive a signal (hereinafter "temperature signal") output by the resistance temperature detector RTD.

A data pin RXD2 of the processor 10 and a data pin TXD0 of the processor 10 are coupled to the communication unit 41, for transmitting data with external GSM through the communication unit 41. A data pin TXD1 of the processor 10 is coupled to a base of the electronic switch Q1. An emitter of the electronic switch Q1 is coupled to a power source terminal VCC, to receive a voltage of the battery 80. A collector of the electronic switch Q1 is coupled to a first terminal of the speaker 420. A second terminal of the speaker 420 is grounded. Data pins D0, D1, D2, D3, D4, D5, D6, D7 of the processor 10 are respectively coupled to input pins D0, D1, D2, D3, D4, D5, D6, D7 of the first latch 61. The data pins D0, D1, D2, D3, D4, D5, D6, D7 of the processor 10 are also respectively coupled to the input pins D0, D1, D2, D3, D4, D5, D6, D7 of the second latch 62. An enable pin OE0 of the processor 10 is coupled to an enable pin OE of the first latch 61. An enable pin OE1 of the processor 10 is coupled to an enable pin OE of the second latch 62. Each voltage pin VIN of the two latches 61, 62 is coupled to the power source terminal VCC. Each ground pin GND of the latches 61, 62 is grounded. Output pins Q0, Q1, Q2, Q3, Q4, Q5, Q6, Q7 of the first latch 61 are respectively coupled to data pins a, b, c, d, e, f, g, h of the display unit 50. Output pins Q0, Q1, Q2 of the second latch 62 are respectively coupled to selected pins D1, D2, D3 of the display unit 50. The selected pins D1, D2, D3 of the display unit 50 are respectively coupled to the three numeric displays 51, 52, 53. Output pins Q3, Q4, Q5, Q6, Q7 of the second latch 62 are exposed.

When the active contact 2 of the slip switch is coupled to the stationary contact 3 of the slip switch SW, the battery 80 can supply power to the prompt circuit 100 through the slip switch SW. The prompt circuit 100 starts operating. The resistance temperature detector RTD outputs different resistances, according to different liquid temperatures in the cup 300. The processor 10 receives a first voltage corresponding to the resistance output from the resistance temperature detector RTD through the data pin RXD0. The processor 10 can determine a temperature of the liquid in cup 300, and controls the first and second latches 61, 62 to respectively output a segment signal and a selected signal. The selected pins D1, D2, D3 of the display unit 50 receives the selected signal, to cause the corresponding numeric displays to be lit. The data pins a, b, c, d, e, f, g, h of the display unit 50 receives the segment signal. The numeric display indicate the temperature of the liquid in the cup 300, according to the segment signal received, for reminding the user about the liquid temperature in the cup 300.

The resistance weight detector RW detects a weight of the liquid in the cup 300, and transmits the weight detected to the processor 10 through the data pin RXD1. In the embodiment, when the processor 10 detects that the weight of the liquid in the cup 300 has decreased at a rate of less than 200 ml per hour, the data pin TXD1 of the processor sends a digital high signal to the electronic switch Q1. The electronic switch Q1 is turned on. The speaker 420 outputs an alarm, to remind the user to drink on time. After the speaker 420 has output an alarm, if the weight of the liquid in the cup 300 has not changed in a period of five minutes as detected by the processor 10, the data pin TXD0 of the processor 10 sends a digital high signal to the communication unit 41. The GSM chip 410 of the communication unit 41 sends a message to the mobile phone number stored in the storage unit 411, to remind the user to take a drink.

When the active contact 2 of the slip switch SW is coupled to the stationary contact 1 of the slip switch SW, the battery 80 cannot supply power to the prompt circuit 100 through the slip switch SW. The prompt circuit 100 does not operate and a prompt function of the cup 300 is turned off.

The weight of liquid in the cup can be detected by the weight sensing unit of the prompt circuit. When any decrease in weight of liquid within a preset time in the cup is less than a preset value, the processor controls the prompt unit to output an alarm and a message to the user, to remind the user to drink on time.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A prompt circuit comprising:
    a weight sensing unit configured to detect a weight change of liquid in a cup;
    a processor coupled to the weight sensing unit, configured to receive the weight change; and
    a prompt unit coupled to the processor, and comprising a communication unit and a speaker unit;
    wherein when the weight sensing unit detects the weight change is less than a preset value, the processor sends a first control signal to the prompt unit to control the speaker unit to output an alarm signal; and
    when the weight sensing unit detects the weight of liquid in the cup in unchanged for a preset time period after the output of the alarm, the processor outputs a second control signal to the prompt unit to control the communication unit to output a reminding message.

2. The prompt circuit of claim 1, further comprising a switch unit; wherein a switch unit first terminal is coupled to a processor voltage input pin, and a switch unit second terminal is coupled to a battery.

3. The prompt circuit of claim 2, wherein the switch unit comprises a slip switch; a slip switch active contact is coupled to the processor voltage input pin, a slip switch first stationary contact is grounded, a slip switch second stationary contact is coupled to the battery;
    when the slip switch first stationary contact is coupled to the slip switch active contact, the battery cannot supply power to the processor; and
    when the slip switch second stationary contact is coupled to the slip switch active contact, the battery supply power to the processor through the slip switch.

4. The prompt circuit of claim 3, wherein the weight sensing unit comprising a resistance weight detector and a first resistor; a first resistor first terminal is coupled to the processor voltage input pin, a first resistor second terminal is coupled to a resistance weight detector first terminal; a resistance weight detector second terminal is grounded; and a processor first data pin is coupled to a node between the first resistor and the resistance weight detector.

5. The prompt circuit of claim 2, further comprising a temperature sensing unit; wherein the temperature sensing unit comprises a resistance temperature detector and a second resistor; a second resistor first terminal is coupled to the processor voltage input pin, a second resistor second terminal is coupled to a resistance temperature detector first terminal; a resistance temperature detector second terminal is grounded; a processor second data pin is coupled to a node between the second resistor and the resistance temperature detector; and the temperature sensing unit transmits a liquid temperature in the cup to the processor.

6. The prompt circuit of claim 5, further comprising a latch unit and a display unit; wherein the processor transmits the liquid temperature in the cup to the display unit through the latch unit, and the display unit displays the liquid temperature in the cup.

7. The prompt circuit of claim 6, wherein the display unit comprises three numeric displays; the three numeric displays comprises first, second, and third segment pins, the three segment pins are corresponding to the three numeric displays;
    the latch unit comprises a first latch and a second latch, first latch eight input pins and second latch eight input pins are coupled to processor eight data pins, a processor first enable pin and a processor second enable pin are coupled to a first latch enable pin and a second latch enable pin respectively, first latch eight output pins are coupled to display unit eight data pins; and second latch first, second, and third output pins are coupled to the first, second, and third segment pins respectively.

8. The prompt circuit of claim 1, wherein the communication unit comprises a global system for mobile communication (GSM) chip and a storage unit; and the storage unit stores a user mobile phone number, and the GSM chip outputs the reminding message to the user mobile phone number, according to the second control signal.

9. A cup comprising a prompt circuit, the prompt circuit comprising:
   a weight sensing unit configured to detect a weight change of liquid in a cup;
   a processor coupled to the weight sensing unit, configured to receive the weight change; and
   a prompt unit coupled to the processor, and comprising a communication unit and a speaker unit;
   wherein when the weight sensing unit detects the weight change is less than a preset value, the processor sends a first control signal to the prompt unit to control the speaker unit to output an alarm signal; and
   when the weight sensing unit detects the weight of liquid in the cup in unchanged for a preset time period after the output of the alarm, the processor outputs a second control signal to the prompt unit to control the communication unit to output a reminding message.

10. The cup of claim 9, the prompt circuit further comprising a switch unit; wherein a switch unit first terminal is coupled to a processor voltage input pin, and a switch unit second terminal is coupled to a battery.

11. The cup of claim 10, wherein the switch unit comprises a slip switch; a slip switch active contact is coupled to the processor voltage input pin, a slip switch first stationary contact is grounded, a slip switch second stationary contact is coupled to the battery;
   when the slip switch first stationary contact is coupled to the slip switch active contact, the battery cannot supply power to the processor; and
   when the slip switch second stationary contact is coupled to the slip switch active contact, the battery supply power to the processor through the slip switch.

12. The cup of claim 11, wherein the weight sensing unit comprising a resistance weight detector and a first resistor; a first resistor first terminal is coupled to the processor voltage input pin, a first resistor second terminal is coupled to a resistance weight detector first terminal; a resistance weight detector second terminal is grounded; and a processor first data pin is coupled to a node between the first resistor and the resistance weight detector.

13. The cup of claim 10, the prompt circuit further comprising a temperature sensing unit; wherein the temperature sensing unit comprises a resistance temperature detector and a second resistor; a second resistor first terminal is coupled to the processor voltage input pin, a second resistor second terminal is coupled to a resistance temperature detector first terminal; a resistance temperature detector second terminal is grounded; a processor second data pin is coupled to a node between the second resistor and the resistance temperature detector; and the temperature sensing unit transmits a liquid temperature in the cup to the processor.

14. The cup of claim 13, the prompt circuit further comprising a latch unit and a display unit; wherein the processor transmits the liquid temperature in the cup to the display unit through the latch unit, and the display unit displays the liquid temperature in the cup.

15. The cup of claim 14, wherein the display unit comprises three numeric displays; the three numeric displays comprises first, second, and third segment pins, the three segment pins are corresponding to the three numeric displays;
   the latch unit comprises a first latch and a second latch, first latch eight input pins and second latch eight input pins are coupled to processor eight data pins, a processor first enable pin and a processor second enable pin are coupled to a first latch enable and a second latch enable pin respectively, first latch eight output pins are coupled to display unit eight data pins; and
   second latch first, second, and third output pins are coupled to the first, second, and third segment pins respectively.

16. The cup of claim 9, wherein the communication unit comprises a global system for mobile communication (GSM) chip and a storage unit; and the storage unit stores a user mobile phone number, and the GSM chip outputs the reminding message to the user mobile phone number, according to the second control signal.

* * * * *